US010800265B2

(12) United States Patent
Berardi (10) Patent No.: US 10,800,265 B2
(45) Date of Patent: Oct. 13, 2020

(54) SOLAR POWERED BOAT AND SOLAR PANEL MOUNTING KIT

(71) Applicant: ANFIBIO INC., Laval (CA)

(72) Inventor: Sebastiano Berardi, Laval (CA)

(73) Assignee: ANFIBIO INC., Laval, Québec (CA)

( * ) Notice: Subject to any disclaimer, the term of this patent is extended or adjusted under 35 U.S.C. 154(b) by 260 days.

(21) Appl. No.: 16/054,679

(22) Filed: Aug. 3, 2018

(65) Prior Publication Data
US 2019/0039459 A1 Feb. 7, 2019

Related U.S. Application Data

(60) Provisional application No. 62/541,172, filed on Aug. 4, 2017.

(51) Int. Cl.
| | |
|---|---|
| *B60L 8/00* | (2006.01) |
| *B63H 21/17* | (2006.01) |
| *B63J 3/04* | (2006.01) |
| *B63B 17/00* | (2006.01) |
| *B63H 21/00* | (2006.01) |
| *B63B 34/20* | (2020.01) |

(52) U.S. Cl.
CPC .............. *B60L 8/003* (2013.01); *B63B 17/00* (2013.01); *B63H 21/17* (2013.01); *B63J 3/04* (2013.01); *B60L 2200/32* (2013.01); *B63B 34/20* (2020.02); *B63H 2021/003* (2013.01); *B63H 2021/171* (2013.01)

(58) Field of Classification Search
CPC ...... B60L 8/003; B60L 2200/32; B63B 17/00; B63B 34/20; B63H 21/17; B63H 2021/003; B63H 2021/171; B63J 3/04; H02J 7/35
USPC .......................................................... 320/101
See application file for complete search history.

(56) References Cited

U.S. PATENT DOCUMENTS

| | | | | |
|---|---|---|---|---|
| 5,131,341 | A * | 7/1992 | Newman | .................... H02J 7/35 114/39.21 |
| 6,000,353 | A | 12/1999 | De Leu | |
| 7,047,902 | B1 * | 5/2006 | Little | ...................... B63B 17/02 114/292 |
| 7,887,381 | B2 | 2/2011 | Brass | |
| 8,047,153 | B2 * | 11/2011 | Wood | ...................... B63B 34/20 114/292 |

\* cited by examiner

*Primary Examiner* — Nathaniel R Pelton
(74) *Attorney, Agent, or Firm* — Medler Ferro Woodhouse & Mills PLLC (57) ABSTRACT

A solar-powered boat comprising a hull which comprises a bottom panel and side panels extending upwardly from opposed sides of the bottom panel for defining a hull interior region. At least one of the side panels comprises an upper section angled inwardly with respect to an axis orthogonal to the bottom panel; and at least one panel opening provided in the upper section. The solar-powered boat is further comprised of at least one solar panel configured to supply electricity to the boat, the solar panel being mounted within the panel opening using a solar panel mounting kit.

20 Claims, 7 Drawing Sheets

SOLAR POWERED BOAT AND SOLAR PANEL MOUNTING KIT

CROSS-REFERENCE TO RELATED APPLICATIONS

This application claims priority to U.S. Provisional Application No. 62/541,172, filed Aug. 4, 2017, the entire contents of which are incorporated by reference herein.

TECHNICAL FIELD

The technical field generally relates to boats, and more particularly to boats having a hull provided with solar panels.

BACKGROUND

Solar power involves converting sunlight into electricity and can be used for a large number of applications. Solar technologies cover a wide spectrum of applications, from calculators powered by a single solar cell to houses and apartments powered by solar panels located on the roofs.

An issue often raised in relation to the use of solar power is the high cost of producing/manufacturing solar panels as they use expensive semiconductor material to generate electricity from the sun. In addition, installing multiple solar panels, on a roof of a house for example, can also be expensive and further requires experienced technicians. Moreover, maintenance of these solar panels can be costly and time-consuming since they must remain completely free of dust or other debris in order to operate at maximum efficiency.

There exists in the boating industry boats and/or ships provided with solar panels for powering either a motor or accessories, such as lights and outlets for appliances. These systems can have drawbacks, such as needing a roof big enough to mount a plurality of solar panels thereon. As such, most boats provided with solar panels are large vessels, adapted to transport groups of people, vehicles or cargo. There is thus a need for a solar-powered boat configured to accommodate smaller groups of people, or even a single person.

SUMMARY

According to a first aspect, a solar-powered boat is provided. The solar-powered boat comprising: a hull comprising: a bottom panel and side panels extending upwardly from opposed sides of the bottom panel for defining a hull interior region, at least one side panel including: an upper section angled inwardly with respect to a vertical axis and at least one panel opening provided in the upper section; and at least one solar panel configured to supply electricity to the boat, the solar panel being mounted within the panel opening.

According to one possible embodiment, the side panels each include a lower section extending upwardly from the bottom panel and connecting at an upper part thereof to the corresponding upper section of the corresponding side panel.

According to another embodiment, the lower section of each side panel defines a substantially perpendicular angle with the bottom panel.

According to a possible embodiment, the upper section of the at least one side panel defines an angle between about 10 and about 60 degrees with respect to the vertical axis.

According to another possible embodiment, the upper section of the at least one side panel defines an angle between about 15 and about 55 degrees with respect to the vertical axis.

According to yet another possible embodiment, the upper section of the at least one side panel defines an angle between about 20 and about 50 degrees with respect to the vertical axis.

According to yet another possible embodiment, the upper section of the at least one side panel defines an angle between about 25 and about 45 degrees with respect to the vertical axis.

According to yet another possible embodiment, the upper section of the at least one side panel defines an angle between about 30 and about 40 degrees with respect to the vertical axis.

According to yet another possible embodiment, the upper section of the at least one side panel defines an angle between about 33 and about 37 degrees with respect to the vertical axis.

According to a possible embodiment, the opposed sides of the bottom panel respectively correspond to a port side and a starboard side of the boat.

According to another possible embodiment, the solar-powered boat includes a stern and wherein the hull comprises a back panel provided at the stern of the boat, the back panel joining the bottom panel and the side panels.

According to a possible embodiment, the solar-powered boat further includes a bow and wherein each of the bottom panel and side panels comprises a front section, the front section of the bottom panel being curved in an upward direction and the front section of the side panels being shaped to join the front section of the bottom panel at the bow of the boat.

According to a possible embodiment, the bow of the boat is substantially parallel to the stern of the boat.

According to a possible embodiment, at least one seat is provided within the hull interior region.

According to a possible embodiment, the seat is a bench having opposed ends attached to the upper section of each of the side panels.

According to a possible embodiment, the hull further includes a top peripheral edge defined by corresponding panels of the hull, and at least one handle attached to the top peripheral edge and adapted to allow transportation and/or manipulation of the solar-powered boat.

According to a possible embodiment, the solar panels are toolessly mounted within the panel openings.

According to another aspect, a solar panel mounting kit for removably mounting a solar panel within a panel opening of a hull of a boat is provided. The solar panel mounting kit includes a plurality of mounting components, each for mounting a corresponding panel edge of the solar panel with respect to a corresponding side edge defining the panel opening. Each mounting component includes an outer cap having an outward-facing surface and an inward-facing surface, and a projection extending from the inward-facing surface of the cap and defining first and second overhang sections of the cap on either side of the projection. The second overhang section and projection defining a recess therebetween to receive a side edge of the solar panel. The mounting components further include a proximal strip extending from the projection in spaced-apart relation to the first overhang section of the cap and defining a proximal channel therebetween for receiving a side edge of the panel opening, a distal strip extending from the projection in spaced-apart relation to the proximal strip and defining a distal channel therebetween. The solar panel mounting kit further includes a plurality of fastening elements for fastening the mounting components to the corresponding solar panel and the panel of the hull. Each fastening element having a first end portion insertable into the distal channel, a middle portion extending form the first end portion around the distal strip and a second end portion engaging part of the solar panel and disposed in opposed relation to the second overhang of the cap. Each fastening element is configured for securing the solar panel edge within the recess via snap-fit connection in between the second end portion and the second overhang.

According to possible embodiments, the projection extends substantially perpendicularly from the outer cap and extends substantially from the center of the outer cap so as the two overhang sections are of substantially equal length.

According to another possible embodiment, at least one of the strips extends substantially perpendicularly from the projection. The projection, the proximal and distal strips have the same length along the mounting component.

According to another possible embodiment, the outer cap of at least one of the mounting components has a length greater than the projection, the proximal strip and/or the distal strip, such as it extends over the hull of the boat on at least one side of the mounting component.

According to another possible embodiment, the distal strip extends from a distal end of the projection, defining therewith an L-shape in cross-section. The distal and proximal strips extend in a substantially mutually parallel manner defining, with the projection and the first overhang section, an E-shape in cross-section.

According to another possible embodiment, when viewing the mounting component in cross-section, the distal strip extends further from the projection than the proximal strip. The distal strip has a hooking mound around which the first end portion of respective fastening elements extends.

According to another possible embodiment, the distal channel has a width which is greater than that of the proximal channel.

According to another possible embodiment, when viewing the mounting component in cross-section, the distal strip extends from the projection as far as the first overhang section and a play exists between the fastening element and the proximal strip.

According to another possible embodiment, the outward-facing surface of the outer cap comprises a plurality of grooves spanning along the mounting component.

According to possible embodiments, the mounting component is made from a one-piece extruded unit. The mounting component is made from a plastic material and is rigid/flexible.

According to another possible embodiment, the solar panel is substantially rectangular and comprises four panel edges. The first end portion of the fastening elements is curved inwardly on itself.

According to another possible embodiment, each panel edge is secured within corresponding recess of corresponding mounting component by at least two fastening elements.

According to another possible embodiment, the mounting components are elongated mounting components.

According to another possible embodiment, each mounting component is toolessly connectable to one of the side edges of the panel opening.

According to another possible embodiment, the solar panel is toolessly mounted within the panel opening.

According to a third aspect, a method for mounting a solar panel onto the solar-powered boat as described above, using the solar panel mounting kit as describe above is provided. The method includes the steps of attaching one mounting component on each side of the panel opening of the hull by inserting each side of the panel opening within the proximal channel of respective mounting component of the solar panel mounting kit. Then, positioning the solar panel within the panel opening and within the recess of each mounting component. Finally, fastening the solar panel within the panel opening using at least one fastening element for each mounting component.

According to a possible embodiment, the method further includes the step of fixedly attaching the fastening element to the rear surface of the mounting component using mechanical fasteners.

According to a possible embodiment, the step of fastening the solar panel within the panel opening using the fastening elements includes sliding the first end portion over the hooking mound and within the distal channel of the corresponding mounting component and positioning the second end portion on the solar panel.

According to a final aspect of the invention, a solar panel mounting kit for removably mounting a solar panel within a panel opening of a hull of a boat is provided. The solar panel mounting kit includes a plurality of mounting components, each for mounting a corresponding panel edge of the solar panel with respect to a corresponding side edge defining the panel opening. Each mounting component includes an outer cap having an outward-facing surface and an inward-facing surface, and a projection extending from the inward-facing surface of the cap and defining first and second overhang sections of the cap on either side of the projection. The second overhang section and the projection defining a recess therebetween to receive a side edge of the solar panel. The mounting components further include a strip extending from the projection in spaced-apart relation to the first overhang section and defining a channel therebetween for receiving a side edge of the panel opening. The mounting kit further includes a plurality of fastening elements for fastening the mounting components to the corresponding solar panel and the panel of the hull, each fastening element having a first end portion insertable into the channel, a middle portion extending form the first end portion around the strip, and a second end portion engaging part of the solar panel and disposed in opposed relation to the second overhang of the cap. Each fastening element is configured to secure the solar panel edge within the recess via snap-fit connection between the second end portion and the second overhang.

According to a possible embodiment, the outward-facing surface of the outer cap comprises a plurality of grooves spanning along the mounting component.

According to a possible embodiment, the projection extends substantially perpendicularly from the outer cap and extends substantially from the center of the outer cap so as the two overhang sections are of substantially equal length.

According to another possible embodiment, the strip is a distal strip; and wherein the mounting component further comprises a proximal strip extending from the projection between the distal strip and the outer cap, the proximal strip being spaced-apart from the outer cap and defining a proximal channel therebetween for receiving the side edge of the panel opening, the distal strip being spaced-apart from the proximal strip and defining a distal channel therebetween for receiving the first end of the fastening element.

According to a possible embodiment, at least one of the strips extends substantially perpendicularly from the projection. The projection, the proximal and distal strips have the same length along the mounting component.

According to another possible embodiment, the outer cap of at least one of the mounting components has a length greater than the projection, the proximal strip and/or the distal strip, such as it extends over the hull of the boat on at least one side of the mounting component.

According to possible embodiments, the distal strip extends from a distal end of the projection, defining therewith an L-shape in cross-section. The distal and proximal strips extend in a substantially mutually parallel manner defining, with the projection and the first overhang section, an E-shape in cross-section.

According to possible embodiments, when viewing the mounting component in cross-section, the distal strip extends further from the projection than the proximal strip and has a hooking mound around which the first end portion of respective fastening elements extends.

According to a possible embodiment, the distal channel has a width which is greater than that of the proximal channel.

According to a possible embodiment, when viewing the mounting component in cross-section, the distal strip extends from the projection as far as the first overhang section.

According to a possible embodiment, a play exists between the fastening element and the proximal strip.

According to possible embodiments, the mounting component is made from a one-piece extruded unit, is made from a plastic material and is rigid/flexible.

According to a possible embodiment, the solar panel is substantially rectangular and comprises four panel edges.

According to a possible embodiment, the first end portion of the fastening elements is curved inwardly on itself and each panel edge is secured within corresponding recess of corresponding mounting component by at least two fastening elements.

According to a possible embodiment, the mounting components are elongated mounting components.

According to a possible embodiment, each mounting component is toolessly connected to one of the side edges of the panel opening.

According to a possible embodiment, the solar panel is toolessly mounted within the panel opening.

DETAILED DESCRIPTION

As will be explained below in relation to various embodiments, a solar-powered boat is described in combination with a solar panel mounting kit for mounting a solar panel on the hull of a boat. The boat has a hull having side panels provided with at least one panel opening in which a solar panel can be mounted. A portion of the side panels can be inclined to have the solar panels face upwardly, towards the sky. The solar panel mounting kit can include a plurality of mounting components, each adapted to mount a corresponding edge of the solar panel to an edge of the panel opening provided in the side panel.

It should be understood that the term "solar panel", as used herein, refers to a device having one or more modules adapted to absorb sunlight as a source of energy in order to generate electricity. As such, it should be understood that the term "solar-powered boat", as used herein, refers to a boat having at least one solar panel connected thereto generating electricity to at least partially supply the boat in electricity for powering one or more components requiring electricity. For example, the solar panel can power an electric motor that converts electrical energy into mechanical energy and thereby provide movement to the solar-powered boat.

It should be understood that the expression "supply electricity to the boat", as used herein, refers to the process through which the solar panels enable the use of components aboard the boat which requires electricity to function, such as a digital sonar, lights, motor and/or any other suitable components. It should also be understood that the solar panel supplying electricity to the boat may or may not be the only source of electricity powering the boat. For instance, the boat may also be powered by additional and/or alternative sources such as fuel, wind, man-made (e.g., pedals connected to turbines) and/or any other suitable source of energy.

Referring to FIGS. 1 to 4, a solar-powered boat 10 in accordance with possible embodiments is shown. The boat 10 has a hull 12 provided with at least one panel opening in which a solar panel can be mounted. The solar panel can be mounted using a solar panel mounting kit in a manner that will be described below. It should be understood that the term "hull", as used herein, refers to the body of the boat. Traditionally watertight, the hull of the boat includes a plurality of panels connected to one another.

Figure 1:
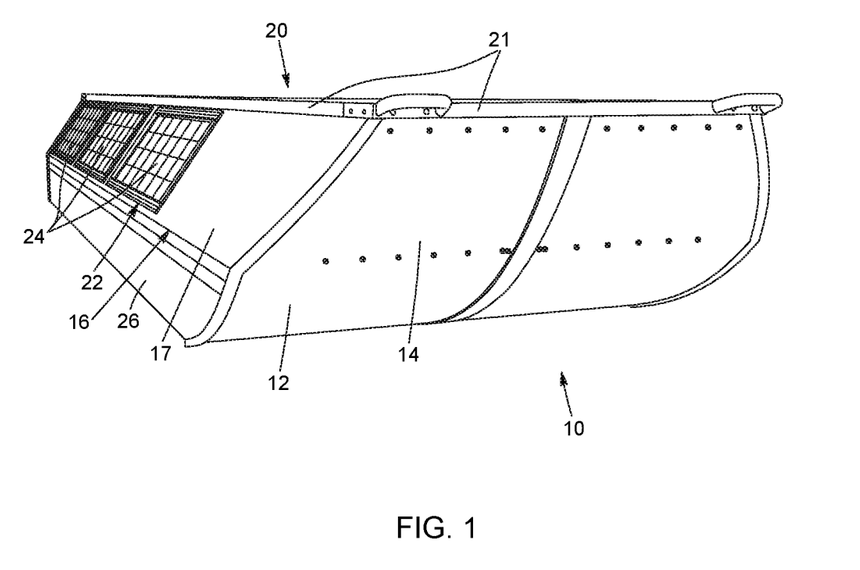
FIG. 1 is a front-perspective view of a solar-powered boat in accordance with an embodiment.
Figure 2:
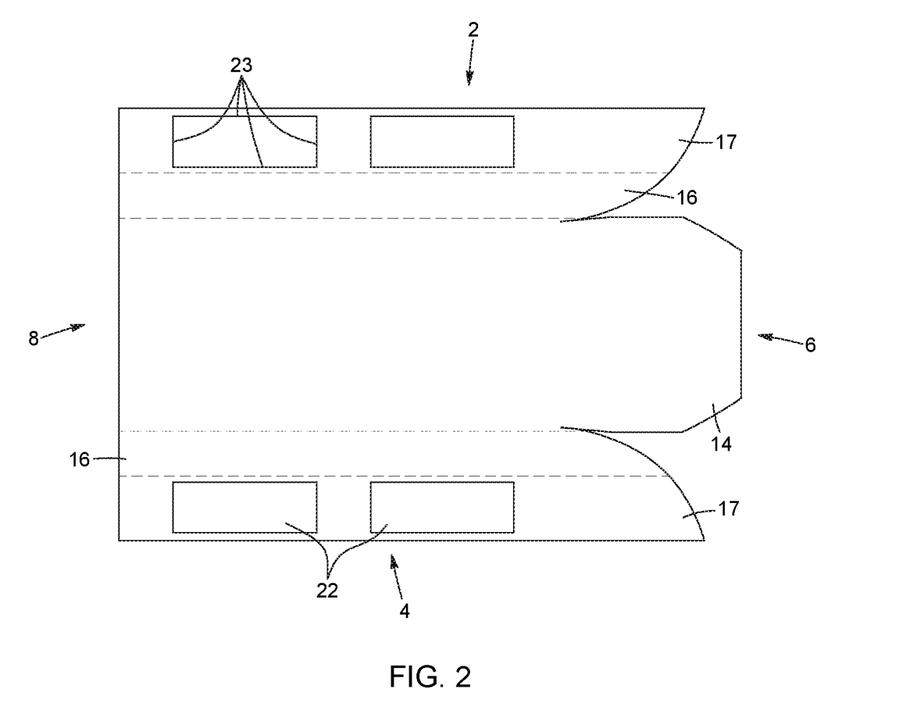
FIG. 2 is a schematic view of a bottom panel, and two side panels provided with panel openings, the panels being made from a single sheet of material in accordance with a possible embodiment.
Figure 3A:
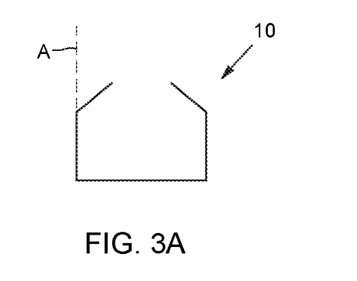
FIGS. 3A to 3F are schematic views of examples of cross-sections of a hull of the solar-powered boat in accordance with possible embodiments.
Figure 3B:
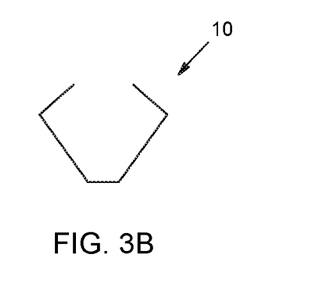
Figure 3C:
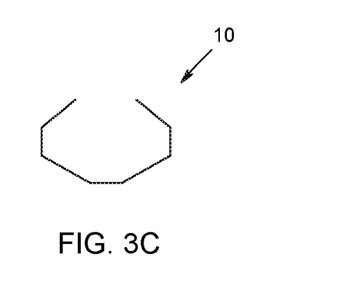
Figure 3D:
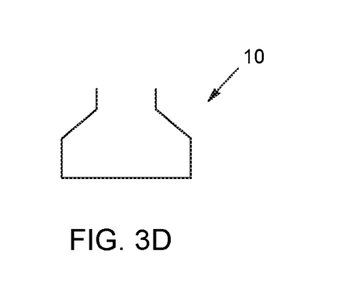
Figure 3E:
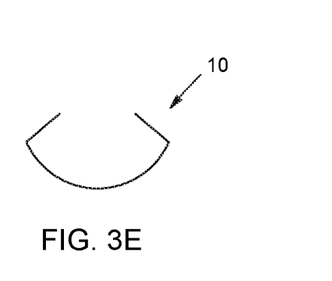
Figure 3F:
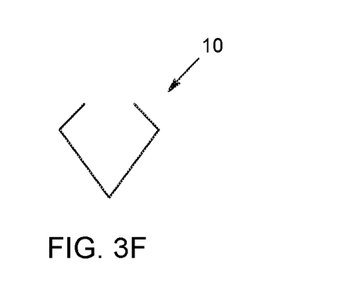

Referring more specifically to FIGS. 1 and 2, the hull 12 of the solar-powered boat 10 can have a substantially flat bottom panel 14 with side panels 16 extending upwardly therefrom on opposed sides. It should be understood that the terms "bottom panel" and "side panels", as used herein, refer to the components of the boat forming the hull 12. Therefore, it should be apparent that the panels can have any suitable shape and size so as to be assembled/connected to one another in a substantially watertight manner.

It should be understood that the opposed sides of the bottom panel 14 respectively correspond to a port side 2 and a starboard side 4 of the boat 10, as illustrated in FIG. 2. Additionally, it should be apparent that the boat 10 further includes a bow 6 and a stern 8 respectively corresponding to a forward section and a rear section of the boat 10. In this embodiment, and as illustrated in FIG. 1, the bottom panel 14 curves upwardly proximate the bow 6 in order to join and be connected to the side panels 16. Furthermore, the hull 12 can include a back panel 18 (FIG. 4) provided at the stern 8 for joining the bottom panel 14 and side panels 16 together, the panels of the hull (i.e., the bottom panel 14, side panels 16 and back panel 18) defining a hull interior region 20. It should also be understood that the term "hull interior region", as used herein, refers to the area of the boat in which any suitable object or person can be transported, such as cargo or passengers for example. As such, it should further be understood that the hull interior region 20 is the area of the boat which is protected from the water via the panels of the hull 12. In this embodiment, the panels of the hull 12 define a top peripheral edge 21 that, when viewed from above, has a generally rectangular shape. As such, it should be understood that the bow 6 is substantially parallel to the stern 8, and that the side panels 16 are substantially parallel to one another. However, it is appreciated that other configurations of the hull are possible and that the panels can define a top peripheral edge 21 having any suitable shape, such as circular, oval, square or triangular for example.

In some embodiments, it is appreciated that the bottom panel 14 and the side panels 16 can be made from a single sheet of material, such as a sheet of steel for example. As best seen in FIG. 2, once the sheet is cut in the desired shape, the side panels 16 can be bent upwardly on either side of the bottom panel 14 and connected to the bottom panel proximate the forward section (i.e., the bow 6). It is appreciated that the material used can have any suitable thickness, as understood by a person skilled in the art.

In this embodiment, each side panel 16 includes an upper section 17 angled in a manner such that an exterior portion of the side panels 16 faces towards the sky. More specifically, the upper section 17 can be angled inwardly (i.e., towards the hull interior region 20) so that the exterior portion of at least the upper section 17 faces upwardly. In some embodiments, the upper section 17 can be provided with at least one panel opening 22 adapted for mounting a solar panel 24 therein. It should be understood that the expression "panel opening", as used herein, refers to the opening provided in the side panel for mounting a solar panel thereon. It should thus be apparent that the panel openings 22 can have generally the same shape and size as the solar panels in order to have a generally watertight hull 12 once the solar panels are installed. In some embodiments, the panel openings 22 can be a recess/cavity defined in the side panels (i.e., the panel openings do not extend all the way through the thickness of the side panels). However, it is appreciated that in order for the solar panels to be connected to one or more components, for example, at least one hole will have to be provided in the side panels for extending wires and/or connections therethrough. Alternatively, the connections of the solar panels can extend through the thickness of the panels of the hull 12 prior to being connected to the components of the boat (e.g., battery).

As such, it should be understood that the solar panel 24, being mounted on the upper section 17 to face towards the sky, is adapted to supply electricity to various components of the boat 10 by capturing sunlight throughout the day. In an exemplary embodiment, and as illustrated in FIG. 1, each side panel 16 can be provided with three panel openings 22, and therefore three solar panels 24. However, it is appreciated that each side panel 16 can include any suitable number of panel openings 22, such as one, two or more than three. It should therefore be understood that the boat 10 can have any suitable length adapted to have any suitable number of panel openings provided therealong. In some embodiments, it is appreciated that only one of the two side panels 16 can include an upper section 17 provided with openings for mounting a solar panel therein. It should also be appreciated that the upper section 17 can be angled inwardly along the entire length of the boat (i.e., from the stern 8 to the bow 6) but can alternatively be angled inwardly only along a portion of the length of the boat 10.

In some embodiments, the upper section 17 can be angled inwardly, with respect to an axis A (FIG. 3A), between about 10 degrees and about 60 degrees. In this embodiment, the axis A can be an axis orthogonal to the bottom panel 14. More specifically, the upper section 17 can be angled between about 30 and 40 degrees in order to allow the solar panels 24 to capture a maximum amount of energy from the sun throughout the day. In the present embodiment, the orientation of the solar panels 24 was determined considering a plurality of factors, such as the sun's trajectory, its height in the sky and the amount of time that the sun is at its brightest. As such, depending on your location, it is appreciated that the upper section 17 can have any suitable angle with respect to the axis to allow the solar panels 24 to be exposed to a substantially optimal amount of sunlight. It is appreciated that the upper section 17 can be mounted on a pivot, or a hinge, that would allow the upper section 17 to adjust its orientation throughout the day in order to operate more efficiently during long periods of time. In this embodiment, the adjustment of the orientation can be done manually by angling/tilting the upper section 17 accordingly, or automatically via sensors connected to the solar panels 24 that would automatically adjust the orientation of the panel depending on the amount/direction of sunlight available at the time.

Still referring to FIGS. 1 and 2, each side panel 16 can further include a lower section 26 extending upwardly from the bottom panel 14, and being connected, at an upper part thereof, to the upper section 17 of the corresponding side panel 16. In this embodiment, the lower section 26 extends substantially perpendicularly from the bottom panel 14, but it should be appreciated that other angles can be suitable for this application. Referring to FIGS. 3A to 3F, multiple embodiments of the cross-sectional shape of the hull 12 are illustrated for exemplary purposes. In the embodiments shown, it should be appreciated that the hull 12 is not covered or protected by a top panel and/or a cabin, therefore keeping the hull interior region 20 open to the surrounding environment. Additionally, the boat 10 can include any suitable nautical accessory/equipment, such as a keel (not shown) installed below the bottom panel 14 to provide increased stability, for example.

Figure 4:
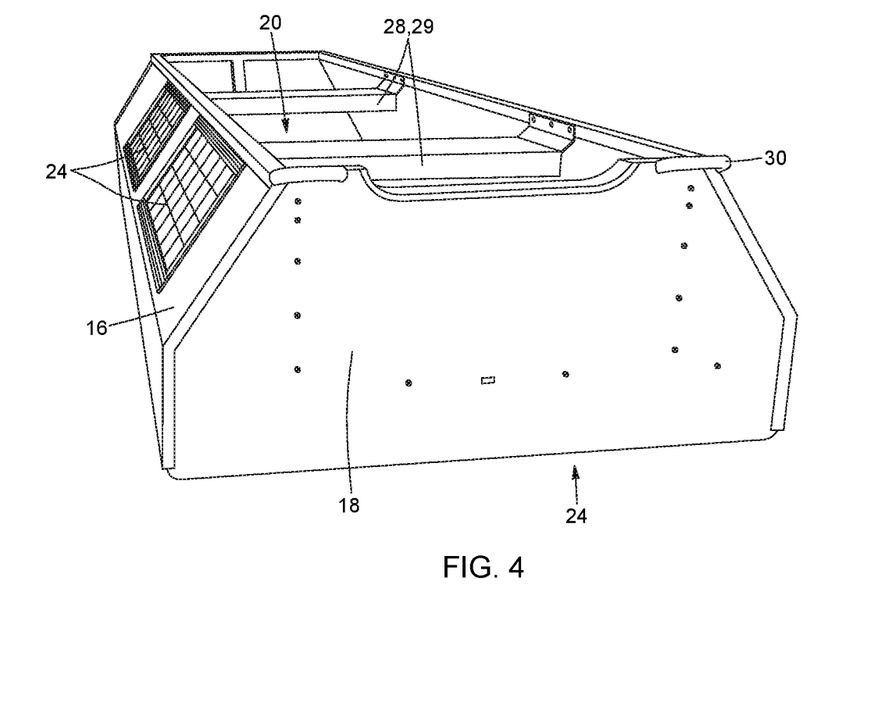
FIG. 4 is a back-perspective view of a solar-powered boat in accordance with an embodiment.

Now referring to FIG. 4, the boat 10 can include at least one seat 28 where passengers can sit while travelling. In the illustrated embodiment, the boat 10 is provided with two seats 28 located within the hull interior region 20, but can be provided with only one seat 28, or more than two. In some embodiments, the seats 28 can be benches 29 attached at both ends thereof to the side panels 16. However, it is appreciated that the boat 10 can be provided with alternative seats 28, such as a chair or a stool, or any other suitable seating device. Moreover, the top peripheral edge 21 can be provided with at least one handle 30 adapted to facilitate manipulation and/or transportation of the boat 10, especially when out of the water. In this embodiment, the boat 10 is provided with four handles 30 located at the four corners of the generally rectangular top peripheral edge 21. However, it should also be appreciated that the boat 10 can be provided with any suitable number of handles 30 mounted to any suitable location of the boat 10.

Referring to FIGS. 5 to 7B, with continued reference to FIGS. 1 to 4, an embodiment of a solar panel mounting kit 40 is illustrated. In this embodiment, each solar panel 24 can be removably mounted within respective panel openings 22 via the solar panel mounting kit 40. More specifically, each panel opening 22 includes a plurality of side edges 23, and each solar panel 24 includes a plurality of panel edges 25 connectable to a corresponding side edge 23. In the present embodiment, the panel openings 22 and the solar panels 24 each include four edges 23, 25 and have generally rectangular shapes. However, it is appreciated that the panel opening 22 and/or the solar panels 24 can have any suitable number of edges, defining any suitable shape, such as triangular for example. However, it should be appreciated that in order to obtain a generally watertight hull 12, the panel openings 22 and the solar panels 24 should have the same amount of edges.

Figure 5:
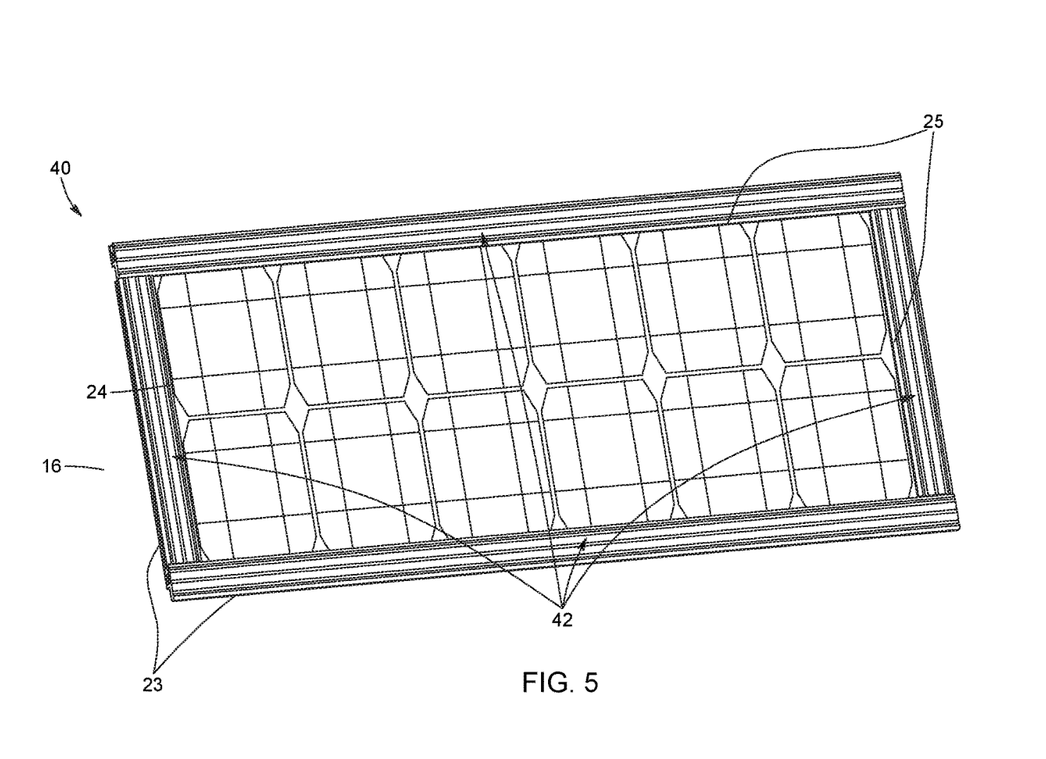
FIG. 5 is a front elevation view of a solar panel mounted within a panel opening of a solar-powered boat using a solar panel mounting kit in accordance with an embodiment.

In this embodiment, the solar panel mounting kit 40 includes a plurality of mounting components 42 for mounting the panel edges 25 on the side edges 23 of the panel opening 22. As illustrated in FIG. 5, the mounting kit 40 can include four mounting components 42 (i.e., one for each panel edge 25). Additionally, the solar panel mounting kit 40 can include a plurality of fastening elements 70 configured to hold and secure the solar panels 24 and the mounting components 42 together, and therefore further secure the solar panels within corresponding panel openings 22. In some embodiments, the mounting components 42 can be made from a single extruded unit but can alternatively be made from multiple portions connected to one another. It should therefore be appreciated that the mounting components 42 can have any suitable shape or size, such as square or rectangular (when viewed from above) for example. As such, in an exemplary embodiment, the mounting components can be elongated mounting components 42. It should be understood that, as used herein, the expressions "elongated" and "elongated mounting component" refer to the shape of the mounting components, where a length thereof is greater along a first axis (e.g., longitudinal) than a length along a second axis (e.g., transversal). In addition, the mounting components 42 can be made from a plastic material but can alternatively be made from a metallic material or any other suitable material.

Figure 7A:
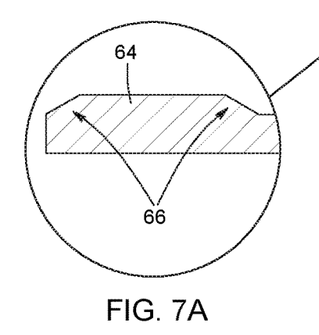
FIG. 7A is an enlarged view of the circled-portion of FIG. 7B.
Figure 7B:
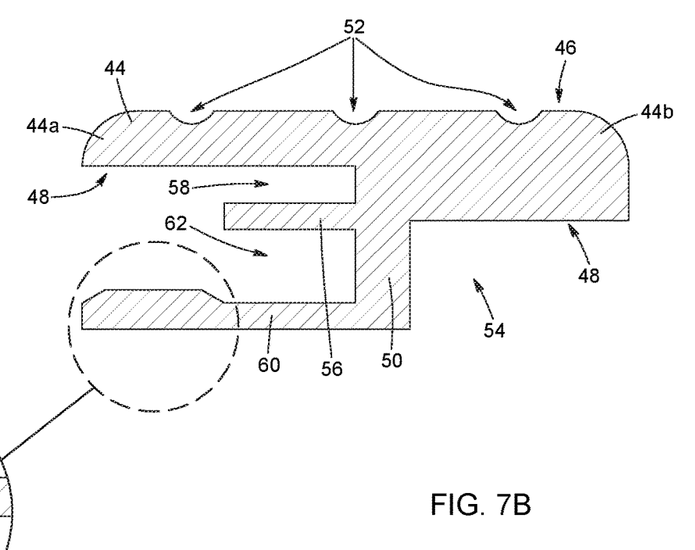
FIG. 7B is a cross-sectional view of an mounting component in accordance with a possible embodiment.

Referring more specifically to the exemplary cross-sectional view of FIG. 7B, the mounting component 42 can include an outer cap 44 having an outward-facing surface 46 and an inward-facing surface 48. In this embodiment, the inward-facing surface 48 can be adapted to abut against both the solar panel 24 and the side panel 16 of the hull 12, as will be explained below. The mounting component 42 can further include a projection 50 extending from the inward-facing surface 48 and defining a first overhang section 44a and a second overhang section 44b extending on either side thereof. In some embodiments, the projection 50 can extend substantially from the center of the inward-facing surface 48 defining overhang sections 44a, 44b of substantially equal length. Alternatively, the projection 50 can extend from any suitable location, therefore defining overhang sections of any suitable length. As illustrated in FIG. 7B, the projection 50, in combination with the second overhang section 44b, can define a recess 54 for receiving one of the panel edges 25 of the solar panel 24, which can be secured therein by at least one fastening element 70. Therefore, it should be understood that the first overhang section 44a can be adapted to abut against the side panel 16, while the second overhang section 44b can be adapted to abut against the solar panel 24. In addition, the outer cap 44 can be provided with a plurality of grooves 52 running along the length of the mounting component 42, as best seen in FIG. 7B, but it is appreciated that the mounting component can alternatively have a flat/smooth outward-facing surface 46.

In some embodiments, the mounting component 42 can further include a first strip, or proximal strip 56, extending from the projection 50 proximate the first overhang section 44a, effectively defining a proximal channel 58 therebetween. It should be understood that the proximal channel 58 can be mounted on a side edge 23 of one of the panel openings 22, therefore connecting the mounting component 42 to the hull 12 (i.e., to the side panel 16). The mounting component 42 can further include a distal strip 60 extending from the projection 50 in a spaced-apart relation to the proximal strip 56, defining a distal channel 62 therebetween. In this embodiment, the distal strip 60 extends from a distal end of the projection 50, defining therewith an L-shaped profile. It should be noted that the distal strip 60 can be adapted to receive one end of at least one fastening element 70 in a manner that will be described below. Moreover, the proximal strip 56 and the distal strip 60 can be parallel to one another and extend substantially perpendicularly from the projection 50. As such, the strips, in combination with the first overhang section 44a and the projection 50, can define a substantially E-shaped profile. Therefore, it is appreciated that the proximal channel 58 and the distal channel 62 can also be parallel to one another and are thus substantially straight along the length of the mounting component 42.

In the illustrated embodiment, the distal strip 60 can extend further from the projection 50 than the proximal strip 56 but extends as far as the first overhang section 44a. Alternatively, the strips can extend from the projection 50 following any suitable direction and have any suitable length, as long as the mounting component 42 can be mounted to the side edge 23. Furthermore, it should be understood that the outer cap 44, the projection 50, the proximal strip 56 and the distal strip 60 can all have the same length along the mounting component 42. However, the outer cap 44 can have a greater length for allowing the mounting component to extend over the side panel 16 on opposed sides thereof, for practical and aesthetic purposes. It is appreciated from the above description that each mounting component 42 can be toolessly connected on a corresponding one of the side edges 23. It should be understood that, as used herein, the expression "toolessly connected", or any other similar expression, refers to the ability of connecting two or more elements together manually and without the use of tools, such as a hammer, a screwdriver, a rivet gun, or any other tool used for connecting elements/components together. In an alternate embodiment, the mounting component 42 can include a single strip, thus defining a single channel between said single strip and first overhang section 44a. The single channel can be wide enough to receive therein both the side edge 23 and one end of at least one fastening element 70.

Figure 6:
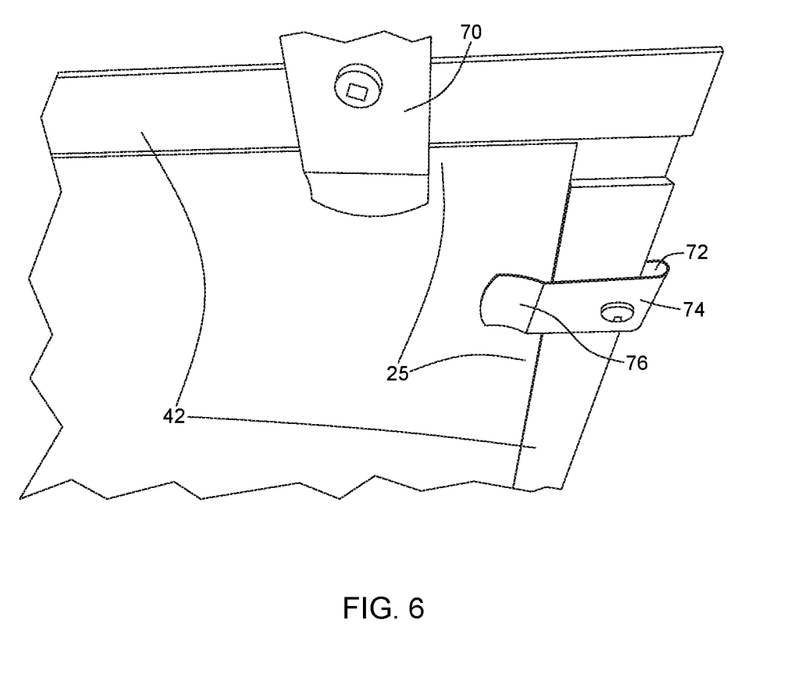
FIG. 6 is a perspective view of fastening elements and mounting components securing a solar panel within a panel opening in accordance with an embodiment.

Referring more specifically to FIG. 6, an exemplary embodiment of the fastening elements 70 is provided. As mentioned above, the fastening elements 70 can be adapted to secure the solar panels 24 within the panel openings 22. More particularly, each fastening element 70 includes a first end portion 72 adapted to be inserted within the distal channel 62 of the mounting component 42, a middle portion 74 extending from the first end portion 72 around the distal strip 60, and a second end portion 76 configured to engage part of the panel edge 25 positioned within the recess 54 of the mounting component 42. In the present embodiment, the second end portion 76 can be positioned opposite the second overhang section 44b to clamp down the panel edge 25 within the recess 54, therefore securing the panel edge 25 therein. As such, each solar panel edge 25 can be secured within the corresponding recess 54 using at least one fastening element 70, but preferably at least two. In this embodiment, the fastening elements 70 can be further provided with mechanical fasteners, such as screws or rivets, to further secure the fastening element 70 to the mounting component 42. It is appreciated that the fastening elements 70 can be made of plastic, metal or any other suitable material.

Referring back to FIGS. 7B and 7A, in addition to FIG. 6, the distal strip 60 of the mounting component 42 can be provided with a hooking mound 64 adapted to have the first end portion 72 of the fastening element 70 extend over it, as described above. The hooking mound 64 extends within the distal channel 62 in order for the fastening element 70 to be hooked within the distal channel 62. In the present embodiment, the first end portion 72 can be curved so as to have a substantially smooth outer surface. Additionally, the hooking mound 64 can be provided with opposed inclined edges 66 to facilitate the insertion of the first end portion 72 within the distal channel by sliding said first end portion 72 over the inclined edges 66. Once the first end portion 72 is inserted within the distal channel 60, the second end portion 76 acts as a clamp, as described above, effectively securing the panel edges 25 within the recess 54, and thus within the panel opening 22 via a snap-fit connection. As such, the solar panels 24 can be mounted within corresponding panel openings 22 without the use of mechanical fasteners, and thus without putting holes in the hull. It should be understood that the expressions "snap-fit", or "snap-fit connection", as used herein, refer to a method of assembling two or more parts by interlocking them together using a generally flexible connector. It is appreciated that snap-fit connections can be used as an alternative to nails and/or screws and can therefore prevent the need to drill holes in the parts needing connection, for example. It should thus be appreciated from the above description that the solar panels 24 can be toolessly mounted within the panel openings 22 via the solar panel mounting kit 40.

In this embodiment, the distal strip 60 can be spaced-apart from the proximal strip 56 as described above so as to provide a play between the fastening elements 70 and the proximal strip 56, facilitating insertion and removal of the fastening element 70. For example, the play can provide sufficient space for someone to insert their fingers to grasp the fastening element 70.

As illustrated in FIG. 5, in addition to FIG. 6, the solar panel mounting kit 40 of the present embodiment includes four mounting components 42 (i.e., one for each side edge 23 of a given opening 22). As such, the mounting kit 40 can include at least four fastening elements 70 for securing the solar panel 24 within the panel opening 22 but can include more. Providing each side edge 23 with a mounting component 42 in order to mount the solar panel 24 within the panel opening 22 provides a substantially watertight hull 12. More particularly, the mounting kit 40 not only adds aesthetics to the boat 10 but can be adapted to reinforce the hull 12, especially once the solar panels 24 are mounted within the openings 22. In other embodiments, it is appreciated that only two mounting components 42 can be used to mount a solar panel 24 within a panel opening 22. More specifically, the solar panels 24 can be mounted using mounting components connected along the top and bottom side edges of the panel opening 22. However, mounting a solar panel 24 using this configuration would not offer the same watertight characteristics as described above.

A method for mounting a solar panel 24 within a corresponding panel opening 22 will now be described. First, the mounting kit 40 is installed in the panel opening 22. More specifically, each mounting component 42 is mounted to each corresponding side edge 23. Then, the solar panel 24 is affixed, from within the hull interior region 20, to insert the panel edges 25 within each corresponding recess 54 of the mounting components 42. Holding the solar panel 24 in that position, fastening elements 70 are positioned along each mounting component 42 to secure the four sides of the solar panel 24 within the panel opening 22 via snap-fit connections. These steps are repeated as needed for each panel opening 22 provided in the hull 12.

It should also be understood that the elements of the drawings are not necessarily depicted to scale, since emphasis is placed upon clearly illustrating the elements and structures of the present embodiments, the drawings can be interpreted as being to scale but should not be limited as such. In the present description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

The invention claimed is:

1. A solar-powered boat comprising:
   a hull comprising:
      a bottom panel; and
      side panels extending upwardly from opposed sides of the bottom panel and defining a hull interior region therebetween, at least one side panel comprising:
         an upper section angled inwardly toward the hull interior region with respect to an axis orthogonal to the bottom panel; and
         at least one panel opening provided in the upper section; and
   at least one solar panel configured to supply electricity to the boat, the solar panel being mounted within the panel opening, the solar panel comprising panel edges that are each mounted to a corresponding side edge of the panel opening via at least one mounting component and a corresponding fastening element,
   each mounting component comprising:
      an outer cap having an outward-facing surface and an inward-facing surface;
      a projection extending from the inward-facing surface of the outer cap and defining a first and second overhang sections of the outer cap on either side of the projection, the second overhang section and the projection defining a recess adapted to receive a corresponding panel edge;
      a proximal strip extending from the projection in spaced-apart relation to the first overhang section and defining a proximal channel therebetween for receiving one of the side edges; and
      a distal strip extending from the projection in spaced-apart relation to the proximal strip and defining a distal channel therebetween,
   each fastening element being adapted to secure the corresponding panel edge within the recess, the fastening element comprising:

a first end portion inserted into the distal channel;
a middle portion extending from the first end portion and around the distal strip; and
a second end portion positioned opposite the second overhang section and engaging part of the solar panel.

2. The solar-powered boat according to claim 1, wherein each one of the side panels comprises a lower section extending upwardly from the bottom panel and connecting at an upper part thereof to the upper section.

3. The solar-powered boat according to claim 2, wherein the lower section of each one of the side panels defines a substantially perpendicular angle with the bottom panel.

4. The solar-powered boat according to claim 1, wherein the upper section of the side panels defines an angle between about 10 and about 60 degrees with respect to the axis.

5. The solar-powered boat according to claim 1, wherein the opposed sides of the bottom panel respectively correspond to a port side and a starboard side of the boat.

6. The solar-powered boat according to claim 1, wherein the hull comprises a back panel joining the bottom panel and the side panels proximate a stern of the boat.

7. The solar-powered boat according to claim 1, wherein the bottom panel is curved in an upward direction at a front section thereof, and wherein the side panels are connected to the front section of the bottom panel proximate a bow of the boat.

8. The solar-powered boat according to claim 7, wherein the bow of the boat is substantially parallel to the stern of the boat.

9. The solar-powered boat according to claim 1, comprising at least one seat provided within the hull interior region.

10. The solar-powered boat according to claim 9, wherein the at least one seat is a bench having opposed ends respectively attached to one of the side panels.

11. The solar-powered boat according to claim 1, wherein the hull further comprises a top peripheral edge defined by the panels of the hull, and at least one handle connected to the top peripheral edge to facilitate transportation and/or manipulation of the solar-powered boat.

12. The solar-powered boat according to claim 1, wherein the solar panels are toolessly mounted within the panel openings.

13. The solar-powered boat according to claim 1, wherein the fastening elements are adapted to secure the solar panel within the panel opening via snap-fit connection.

14. The solar-powered boat according to claim 1, wherein the distal strip has a hooking mound extending within the distal channel, and wherein the first end portion of the fastening element is adapted to extend over the hooking mound, within the distal channel.

15. The solar-powered boat according to claim 1, wherein the mounting components are made from a one-piece extruded unit.

16. The solar-powered boat according to claim 1, wherein the mounting components are rigid/flexible.

17. The solar-powered boat according to claim 1, wherein the mounting components are elongated mounting components.

18. The solar-powered boat according to claim 1, wherein each mounting component is toolessly connectable to one of the side edges of the panel opening.

19. The solar-powered boat according to claim 1, wherein the projection and the proximal and distal strips have the same length along a length of the mounting component.

20. The solar-powered boat according to claim 1, wherein the outer cap of at least one of the mounting components has a length greater than the projection, the proximal strip and/or the distal strip.

* * * * *